United States Patent [19]

Wallén

[11] Patent Number: 4,523,252
[45] Date of Patent: Jun. 11, 1985

[54] DEVICE FOR ELIMINATING STATIC ELECTRICITY

[75] Inventor: Jan O. Wallén, Strängnäs, Sweden

[73] Assignee: J-O Wallen Electronic Int. AB, Strangnas, Sweden

[21] Appl. No.: 486,432

[22] Filed: Apr. 19, 1983

[30] Foreign Application Priority Data

Apr. 27, 1982 [SE] Sweden ................................ 8202628

[51] Int. Cl.³ ............................................. H05F 3/00
[52] U.S. Cl. ..................................... 361/212; 361/220
[58] Field of Search ................ 361/212, 214, 219, 220

[56] References Cited

U.S. PATENT DOCUMENTS

| 579,738 | 3/1897 | Child et al. | 361/214 |
| 1,120,984 | 12/1914 | Thompson | 361/214 |
| 1,396,318 | 11/1921 | Bunger | 361/214 |
| 3,768,227 | 10/1973 | Grisell | 361/212 X |

*Primary Examiner*—Harry E. Moose, Jr.
*Attorney, Agent, or Firm*—Holman & Stern

[57] ABSTRACT

The invention relates to a device, which entirely eliminates static electricity on technical equipment and charged materials. This is effected by using an electric circuit between charging media and machine part, which circuit comprises in series at least one resistor (2), one tunnel diode (3) and one coupling diode (4). A capacitor (5) is connected in parallel over the tunnel diode, and a direct voltage is laid over the resistor (2) and the tunnel diode (3).

1 Claim, 1 Drawing Figure

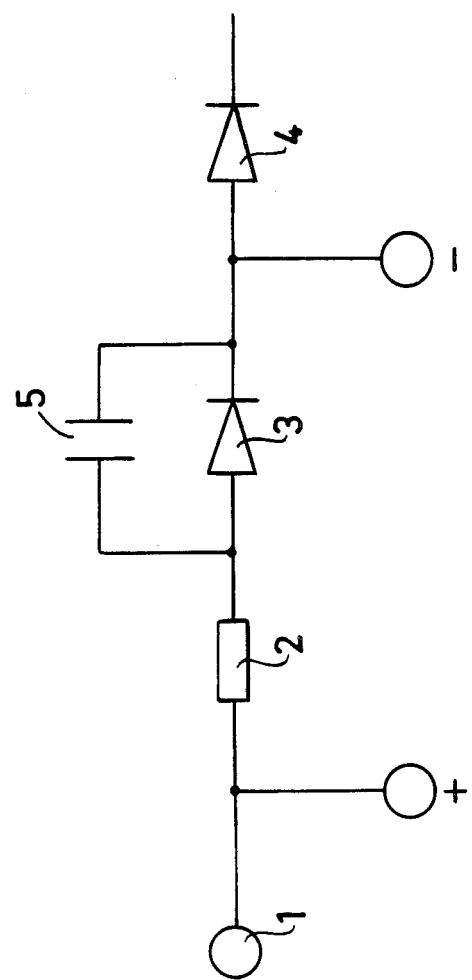

DEVICE FOR ELIMINATING STATIC ELECTRICITY

This invention relates to a device, which entirely eliminates static electricity on technical equipment and charged material.

Static electricity occurs generally. For people in general and within industry it has come to fore with a view to production stops, lower utilization degree, inconveniencies for the production staff and, last not least, to the risk of explosion when discharge takes place in a certain gas and dust concentration.

There exist methods of restricting the static electricity, but they great deficiencies as they are well-known from many enterprises in the plastic, rubber, graphic, packing and papermaking technology.

The present invention and its application eliminate the aforesaid problems.

The invention is characterized in that an electric circuit between charging media and machine part includes in series at least one resistor, one tunnel diode and one coupling diode, that a capacitor is connected in parallel over the tunnel diode, and a direct voltage is laid over the resistor and tunnel diode.

The invention is described in the following, with reference to the accompanying drawing, the FIGURE of which is a connection diagram according to the invention.

Between charging media and, for example, a machine an electric circuit is provided. The circuit is connected at 1 to charging media and comprises in series a resistor 2, a tunnel diode 3 and a coupling diode 4. A capacitor 5 is connected in parallel with the tunnel diode. An external direct voltage is laid over the resistor 2 and tunnel diode 3.

The charge passes the resistor 2 before arriving at the tunnel diode 3, which is located protected with the capacitor 5, which is connected in parallel. When the charge is passing the circuit, the corona phenomenon in the machine, or in the material in which static electricity is to be eliminated, is neutralized. The diode 3, this is of the tunnel diode type (=fast movements on short distances).

When over the circuit (transition) a small voltage is applied, the electrons can tunnel from the conduction band in the p-type part where there is a surplus of conduction electrons, to the valence band in p-type where there is a deficit of electrons.

The current initially increases with increasing voltage, but when the voltage is increased additionally, the current will decrease because the electrons cannot tunnel into the inhibited energy range above the valence band. Hereby a voltage interval with negative resistance is obtained.

When this phenomenon arises, so that the negative resistance has been obtained, the possible charge is "sucked" in to the circuit, and in this way the discharge in the closed circuit is obtained. The charges then can be kept off from machine parts and from worked material where charging occurs.

The charges cannot build up, but return as reference voltage to the charging media. Consequently, no earthing is required between machine and central earth. The potential difference arising at tunneling in the tunnel diode is obtained continuously as long as feed with external power supply takes place.

The invention implies, that an electrically operating earth has been obtained. This can be obtained, thus, by determining at every single occasion the negative resistance of the circuit relative to the size of the charge.

Three parameters are used. Two are voltage and current intensity. By means of these the desired negative resistance is obtained. The third parameter is the charge, which is to be eliminated from the charging media.

The static electricity is eliminated entirely according to the method described above. The method can be carried out by means of a van de Graaf generator or other charge generator. An indicating lamp can be positioned after the tunnel diode so as to light when charge is passing.

I claim:

1. A device for eliminating static charge buildup of a first member from a second member, said device comprising:
    a series circuit electrically connected to said first member, said series circuit including an electrical resistance and a tunnel diode, said tunnel diode being connected to conduct current away from said first member;
    a coupling diode connected between said series circuit and said second member and having a polarity to conduct current toward said second member;
    a capacitor connected in parallel with said tunnel diode; and
    means for applying a small d.c. voltage across said series circuit to produce current flow through said series circuit in a direction away from said first member.

* * * * *